(12) United States Patent
Lee et al.

(10) Patent No.: US 6,230,566 B1
(45) Date of Patent: May 15, 2001

(54) MICROMACHINED LOW FREQUENCY ROCKING ACCELEROMETER WITH CAPACITIVE PICKOFF

(75) Inventors: Abraham P. Lee, Arlington, VA (US); Jonathon N. Simon, San Leandro; Charles F. McConaghy, Livermore, both of CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/410,458

(22) Filed: Oct. 1, 1999

(51) Int. Cl.$^7$ ................................................. G01P 15/125
(52) U.S. Cl. ..................................... 73/514.32; 73/514.38
(58) Field of Search ............................. 73/514.32, 514.38

(56) References Cited

U.S. PATENT DOCUMENTS

| | | | |
|---|---|---|---|
| 4,928,203 | 5/1990 | Swindal et al. | 361/280 |
| 5,337,606 | 8/1994 | Bennett et al. | 73/517 R |
| 5,456,111 | 10/1995 | Hulsing | 73/514.32 |
| 5,524,489 | * 6/1996 | Twigg | 73/514.38 |
| 5,659,195 | 8/1997 | Kaiser et al. | 257/415 |
| 5,905,203 | * 5/1999 | Flach et al. | 73/514.32 |
| 6,082,197 | * 7/2000 | Mizuno et al. | 73/514.36 |

* cited by examiner

Primary Examiner—Richard A. Moller
(74) Attorney, Agent, or Firm—Alan H. Thompson; L. E. Carnahan (57) ABSTRACT

A micro electro mechanical sensor that uses capacitive readout electronics. The sensor involves a micromachined low frequency rocking accelerometer with capacitive pick-off fabricated by deep reactive ion etching. The accelerometer includes a central silicon proof mass, is suspended by a thin polysilicon tether, and has a moving electrode (capacitor plate or interdigitated fingers) located at each end the proof mass. During movement (acceleration), the tethered mass moves relative to the surrounding packaging, for example, and this defection is measured capacitively by a plate capacitor or interdigitated finger capacitor, having the cooperating fixed electrode (capacitor plate or interdigitated fingers) positioned on the packaging, for example. The micromachined rocking accelerometer has a low frequency (<500 Hz), high sensitivity ($\mu$G), with minimal power usage. The capacitors are connected to a power supply (battery) and to sensor interface electronics, which may include an analog to digital (A/D) converter, logic, RF communication link, antenna, etc. The sensor (accelerometer) may be, for example, packaged along with the interface electronics and a communication system in a 2"×2"×2" cube. The proof mass may be asymmetric or symmetric. Additional actuating capacitive plates may be used for feedback control which gives a greater dynamic range.

15 Claims, 9 Drawing Sheets

MICROMACHINED LOW FREQUENCY ROCKING ACCELEROMETER WITH CAPACITIVE PICKOFF

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to sensors, particularly low $\mu$G accelerometer sensors, and more particularly to micromachined rocking accelerometers with capacitive pickoff having low frequency (<500 Hz), high sensitivity ($\mu$G), and low power consumption and cost.

Sensors of various types are being utilized for security and environmental monitoring needs. Network of sensors are being utilized for improved range, sensitivity, directionality, and data readability. It is desirable to use sensor networks composed of individual sensors and associated electronics which are small in size and low in power consumption so as to be powered by a battery that is both small and with a long life. Smaller, low power sensors allow the use of more sensors per network, thus increasing the sensitivity of the network.

As pointed out above, a variety of sensors have been developed for various applications. However, because of low power and small size requirements or certain applications, sensors such as fiber optic devices which require laser power or sensor technologies that require heaters cannot be utilized. Recently micromachined accelerometer type sensors have been developed, but these sensors typically have mG sensitivities, and due to the stiffness of support structures, are designed to operate at high frequency (>5 kHz), and thus are not applicable for applications requiring both high sensitivity and low frequency operation, such as for monitoring large scale structures, to detect ground motion, or passing vehicles. The prior micromachined accelerometers are exemplified by U.S. Pat. No. 4,928,203; No. 5,337,606; No. 5,456,111; and No. 5,659,195, and rely on relatively small mass surface techniques, or wafer bonding to produce a larger proof mass; and use an electrode moved in a semi-linear fashion with respect to another electrode.

The present invention satisfies the above-mentioned requirements for small, low power, low cost sensors, but which operates at low frequency (<500 Hz) and has high sensitivity ($\mu$G). The present invention involves a micromachined low frequency rocking accelerometer with capacitive pickoff fabricated by deep reactive ion etching, and involves a central silicon proof mass suspended by a thin (2 $\mu$m), surface micromachined polysilicon tether. During movement of the sensor, the tethered mass moves relative to the surrounding packaging, and this deflection is measured capacitively by means of plate capacitors or interdigitated finger capacitors. Also, the accelerometer may include a feedback control which enables a greater dynamic range.

SUMMARY OF THE INVENTION

It is an object of the present invention to provide a sensor having low frequency and high sensitivity.

A further object of the invention is to provide a micromachined accelerometer type sensor fabricated by deep reactive ion etching and surface micromachining.

A further object of the invention is to provide an accelerometer constructed by a combination of surface and bulk micromachining/etching techniques which has high sensitivity at low frequencies.

Another object of the invention is to provide a rocking accelerometer which includes a proof mass suspended by a tether, such that upon acceleration the tethered mass moves and this deflection is measured by plate or interdigitated finger capacitors.

Another object of the invention is to provide an accelerometer which consists of a central silicon proof mass suspended by a thin polysilicon tether and having a pair of capacitor elements located on opposite ends of the proof mass and adapted to cooperate with corresponding capacitor elements, such that a rocking motion of the proof mass causes a capacitance change in the oppositely located capacitors.

Another object of the invention is to provide an accelerometer which uses a tethered proof mass which may be asymmetric or symmetric.

Another object of the invention is to provide feedback control for an accelerometer by the use of additional actuating capacitive plates, which gives a greater dynamic range of the accelerometer.

Another object of the invention is to provide an array of accelerometer sensors to provide for simultaneous measurement in orthogonal axes.

Other objects and advantages of the present invention will become apparent from the following description and accompanying drawings. Basically, the invention involves a sensor which includes an accelerometer fabricated by a combination of surface and bulk micromachining and deep reactive etching. The accelerometer includes a low frequency proof mass with capacitive pickoff. More specifically the accelerometer comprises a pair of spaced capacitors with one electrode of each capacitor mounted on a central silicon proof mass suspended by a thin polysilicon tether, whereby deflection or rocking motion of the tethered proof mass causes a change in the capacitance of the spaced capacitors, which is transmitted by interface electronics to a point of use. The capacitors may be of a plate type or of an interdigitated finger type, with one plate or set fingers mounted to the tethered proof mass and the other plate or set of cooperating fingers being mounted to surrounding packaging. The central silicon proof mass is fabricated by deep reactive ion etching and the tether is fabricated using surface micromachining techniques. The accelerometer is designed for low frequency (<500 Hz) and high sensitivity ($\mu$G), and the proof mass may be asymmetric or symmetric. In the rocking configuration, the device acts as a set of differential capacitors, but may be used in a linear configuration wherein the two moving capacitors are compared to a reference capacitor on a substrate or packaging structure. Arrays of these accelerometer sensors may be used to provide for simultaneous measurement in orthogonal axes. Also, an additional capacitive plate may be used for feedback control of the sensor, which gives the sensor a greater dynamic range and is not limited by the maximum deflection of the structure.

DETAILED DESCRIPTION OF THE INVENTION

The present invention is directed to sensors using micromachined accelerometers with capacitive sensing, and which are fabricated using surface and bulk micromachining combined with deep reactive ion etching. The accelerometer with capacitive pickup offers high sensitivity at low frequencies, and thus is particularly applicable for use in monitoring large scale structures, ground movement monitoring, detection of passing vehicles, and as a vibration/acceleration sensor for distributed sensor networks. The micro electro mechanical sensors (MEMS) of the present invention that use capacitive readout electronics are almost passive and are both small is size and require minimal power. The MEMS accelerometer uses a tethered silicon proof mass which moves in relation to its surrounding (or package) and the amount of movement is sensed with variable capacitors attached to the proof mass. The effect used to sense acceleration is similar to the crushing feeling felt when one rapidly ascends in an elevator. The sensitivity of accelerometers to low acceleration is inversely proportional to the size of the mass, so a relatively large mass is needed to sense $\mu$g accelerations. The accelerometer of the present invention utilizes a thin (2 $\mu$m) surface micromachined polysilicon tether which supports a large (400 to 2000 $\mu$m) silicon proof mass carved out of a bulk silicon wafer by deep reactive ion etching (RIE). Deep RIE allows for through wafer etching with aspect ratios of 30:1, thus making these silicon accelerometer structures possible.

In one application of the accelerometer of this invention, the applied acceleration results in the proof mass tilting (rocking) around the torsional suspension or tether, which magnifies the movement of the mass, resulting in changes in the sense capacitor gaps. As the gap decreases in the capacitor at one end of the mass, the gap increases at the opposite capacitor, thus the capacitors at each end of the mass are variable capacitors, and the resulting change in capacitance is picked up by interface electronics. The basic accelerometer requires no power, however low power is required by the electronics used to measure the variable capacitors and thus convert the acceleration to an electrical signal. Additional electronics may be integrated in the same package for signal conditioning, A/D conversion, and wireless data transmission.

A variety of accelerometers have been designed and fabricated for experimental verification, with proof masses ranging from $1.4 \times 10^{-6}$ Kg to $5 \times 10^{-8}$ Kg, and on a 3 mm×3 mm die. The resonant frequency of these tested accelerometers ranged from a low of 16 Hz to a high of 500 Hz, a substantial reduction from the 5 kHz frequency of the prior known micromachined accelerometers. Lower resonant frequency accelerometers typically have greater sensitivity. In ground sensing application, the lower frequencies tend to propagate the furthest. Various differential sense capacitors may be utilized. The interface electronics may consist of a single ended square pulse drive signal which drives one of the plates on both capacitors. A transimpedance amplifier is attached to the other two plates of these sense capacitors. The currents flowing though both capacitors are subtracted to give a representation of the difference in capacitance between the two capacitive sensors and thus a representation of the movement of the proof mass. Finally, the signal is further amplified and digitized by an A/D converter. As pointed out above, the basic accelerometer requires no power, but the low power CMOS interface electronics requires a few mwatts of power, thus enabling long life application with the use of small batteries.

Figure 1:
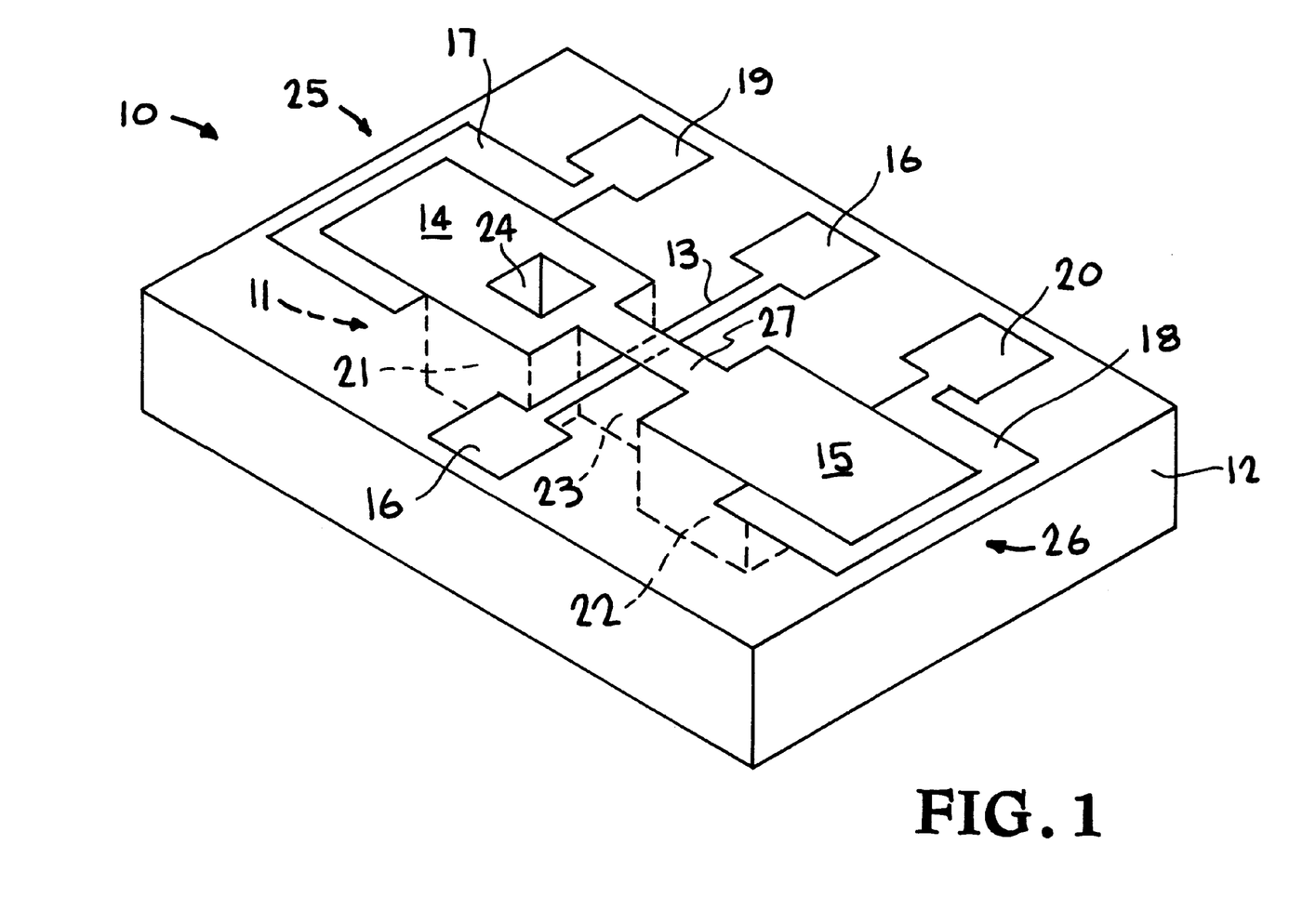
FIG. 1 is a perspective view of an embodiment of the accelerometer of the invention utilizing a tethered proof mass with plate capacitors at opposite ends of the mass.
Figure 2:
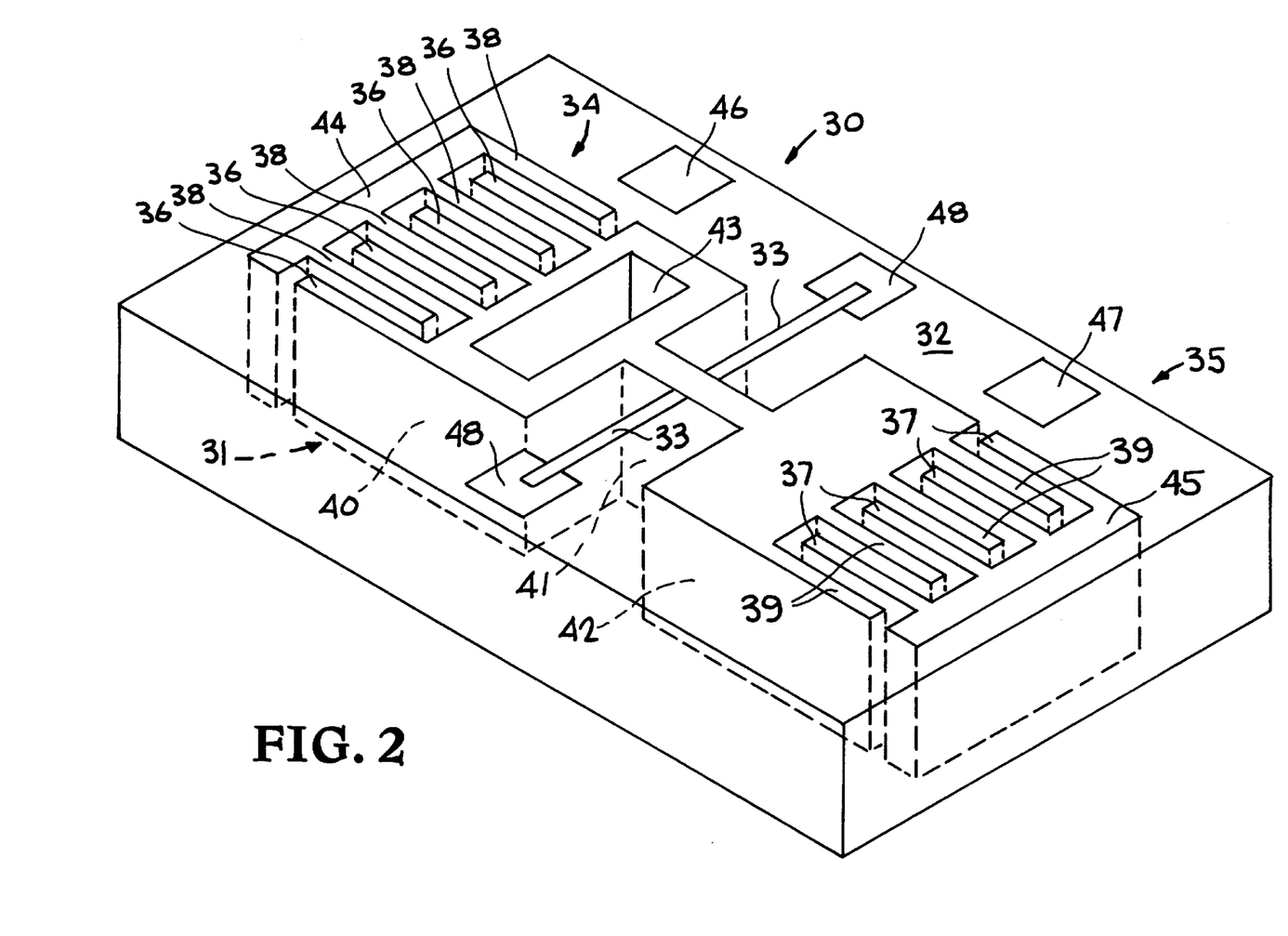
FIG. 2 is a view similar to FIG. 1 utilizing interdigitated finger capacitors at opposite ends of the tethered proof mass.
Figure 4:
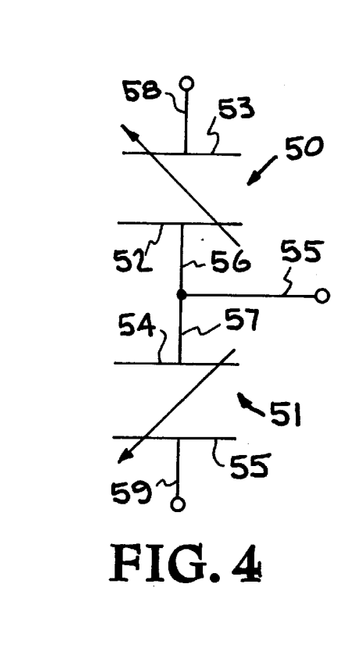
FIG. 4 is an electrical schematic of the capacitors of the accelerometer of either FIGS. 1 or 2 wherein the tether mass is asymmetric and moves in a rocking motion about the tether.

In the tethered accelerometer embodiment of the present invention, described above with the rocking motion, the proof mass is asymmetric, as illustrated in FIGS. 1 and 2, with the mass sections on opposite sides of the tether being different (asymmetric), with the tether used as a torsional spring and the mass moves or rocks about the tether, the tether functioning as a lever arm which amplifies the mechanical motion at the sensing pickup, enhancing the sensitivity. In the rocking embodiment, the device acts as a set of differential capacitors, as illustrated in FIG. 4. However, the proof mass may be a symmetric structure (identical on each side of the tether), wherein the tether acts as a cantilevered support, allowing for linear deflection in the vertical (and in some cases horizontal) axis, and in the linear arrangement, the two moving capacitors are compared to a reference capacitor on the substrate, for example, and the capacitor circuit is of the type shown in FIG. 5, with one variable capacitor and one reference or fixed capacitor.

Also, as illustrated in FIGS. 6–11, and described hereinafter, additional actuating capacitive plates are used for feedback control of the accelerometer, wherein the proof mass is held stationary, and the electrical changes needed to keep it in one place form the output signal. This gives a greater dynamic range to the device, as it is not limited by the maximum deflection of the proof mass structure. Arrays of these sensors may be used to provide for simultaneous measurement in orthogonal axes.

While not shown, in actual operation, the accelerometers of FIGS. 1 and 2 are in an upside down or flipped over position so that deflection of the proof mass is not limited by the 1–3 $\mu$m gaps intermediate the proof mass and the structure or substrate (packaging) in which it is formed and tethered. Thus, in actual operation, the capacitor plates of FIG. 1 would be located beneath the proof mass, and have been illustrated herein in a reversed position for clarity of illustration.

Referring now to FIG. 1, an accelerometer, generally indicated at 10 includes a central silicon proof mass generally indicated at 11, which is formed in a silicon substrate or block 12 by deep reactive ion etching (RIE), and is suspended in substrate 12 by a thin polysilicon tether 13 fabricated using surface micromachining techniques. A pair of interconnected polysilicon moving electrodes 14 and 15 are formed on the surface of proof mass 11 and are connected to the polysilicon tether 13 which is connected on each side of the proof mass 11 to polysilicon pads 16 located on the surface of silicon substrate 12. A pair of fixed electrodes 17 and 18 connected to respective pads 19 and 20 are formed of polysilicon and also located on the surface of silicon substrate 12. The proof mass 11 comprises a pair of body sections or members 21 and 22 interconnected by a center section or member 23 of reduced width, and to which tether 13 is connected. Body section 21 is provided with an opening 24. The moving electrodes 14 and 15 extend beyond the outer ends of body member 21 and 22 so as to be in a spaced relation to respective fixed electrodes 17 and 18. Due to the opening 24 in body section 21, the proof mass 11 is asymmetric, and for embodiments wherein the proof mass 11 are to be symmetric, the opening 24 is not formed in body member 21. The electrode pairs 14/17 and 15/18 form plates of a pair of variable capacitors indicated generally at 25 and 26. Electrodes 14 and 15 are interconnected by a connector section 27 to which the tether 13 is connected.

By way of example, the silicon substrate or block 12 may have a width of 2 mm to 1 cm, a length of 2 mm to 1 cm, and a thickness or height of 300 $\mu$m to 500 $\mu$m. The body sections or members 21 and 22, shown to be of a square configuration, having a width and length of 100 $\mu$m to 900 $\mu$m, with the center section or member having a width of 20 $\mu$m to 900 $\mu$m and length of 50 $\mu$m to 400 $\mu$m, the height of the proof mass sections or members 21–23 being the same as the thickness or height of substrate 12. The thin tether may have a width of 1 $\mu$m to 5 $\mu$m and thickness of 1 $\mu$m to 3 $\mu$m, with the pads 16 having a width of 50 $\mu$m to 200 $\mu$m, length of 50 $\mu$m to 200 $\mu$m and depth or thickness of 1 $\mu$m to 3 $\mu$m. The fixed electrodes 17 and 18 may have a length of 200 $\mu$m to 500 $\mu$m, width of 100 $\mu$m to 900 $\mu$m and depth or thickness of 0.2 $\mu$m to 2 $\mu$m with connector pads 19 and 20 having a width of 50 $\mu$m to 200 $\mu$m, length of 50 $\mu$m to 200 $\mu$m, with a depth or thickness of 0.2 $\mu$m to 2 $\mu$m. The moving electrodes 14 and 15 have an end width of 100 $\mu$m to 900 $\mu$m (which may be the same width as the body sections or members 21 and 22) and extend outward from the body members 21 and 22 by a distance of 200 $\mu$m to 500 $\mu$m and have a thickness of 1 $\mu$m to 3 $\mu$m. The proof mass 11 is spaced from the substrate by a distance of 14–25 $\mu$m, the etching width carried off by the known RIE technique. The tether 13, pads 16, fixed electrodes 17 and 18, and pads 19 and 20 are composed of polysilicon formed by a conventional patterning/conversion process. The opening 24 is formed by deep RIE or by micromachining. The interconnected moving electrodes 14 and 15 are composed of polysilicon and in a level (non-tilted) position define a gap of 1 $\mu$m to 3 $\mu$m with respect to fixed electrodes 17 and 18 in the face up position. In the face down position the gap is 2 $\mu$m–50 $\mu$m. The electrodes 14–15 are formed as sheet on the surface of the proof mass 11 by conventional polysilicon processing, with the end sections which extend from the ends of body member 21 and 22 and which extend over the fixed electrodes. Moving electrodes, tethers, etc. are formed by LPCVD deposition of a polysilicon film, which is on top of a sacrificial oxide. The silicon geometries are patterned and the sacrificial oxide is removed, leaving them freestanding. The fixed electrodes are patterned in a similar manner, although there is no sacrificial material in that case.

FIG. 2 illustrates an embodiment of an accelerometer, indicated generally at 30, which includes a proof mass 31 in a silicon substrate 32 suspended on a tether 33 and having a configuration similar to that of FIG. 1 except that the plate electrodes forming the capacitors 25 and 26 of FIG. 1 are replaced by sets of interdigitized finger capacitors 34 and 35 wherein sets of fingers 36 and 37 forming electrodes are formed on each end of the proof mass 31 and corresponding sets of fingers 38 and 39 forming electrodes are formed on the substrate 32 by deep RIE, with the adjacent fingers being spaced 14–25 $\mu$m. As shown in FIG. 2, the proof mass 31 and capacitors 34 and 35 (finger electrodes 36/38 and 37/39) located at opposite ends of the proof mass 31, comprise an asymmetric proof mass as in the FIG. 1 embodiment, in which case the tether 33 is used as a torsional spring and the mass 31 moves in a rocking motion about the tether 33. The lever arm configuration of FIG. 2 amplifies the mechanical motion at the sensing pickup (capacitors 34 and 35), enhancing the sensitivity. In the FIG. 2 embodiment, as in the FIG. 1 embodiment the rocking of the proof mass 31 causes the accelerometer to act as a set of differential capacitors, as schematically shown in FIG. 4. As seen in FIG. 2, and similar to FIG. 1, the proof mass 31 has three sections 40, 41, and 42 with section 41 interconnecting sections 40 and 42, and to which tether 33 is attached. Section 40 and 42 are provided with the sets of finger 36 and 37, with section 40 having an opening 43 therein, whereby the proof mass 31 is of a asymmetric configuration. As in the FIG. 1 embodiment, the proof mass 31 is spaced from the substrate and the sets of fingers 36–38 and 37–39 are spaced from one another by a distance of 14–25 $\mu$m, the deep RIE width. Conductor pads 46 and 47 electrodes for electrodes 34 and 35 are formed in substrate 32, with tether 33 having conductor pads 48 at each end.

Figure 3:
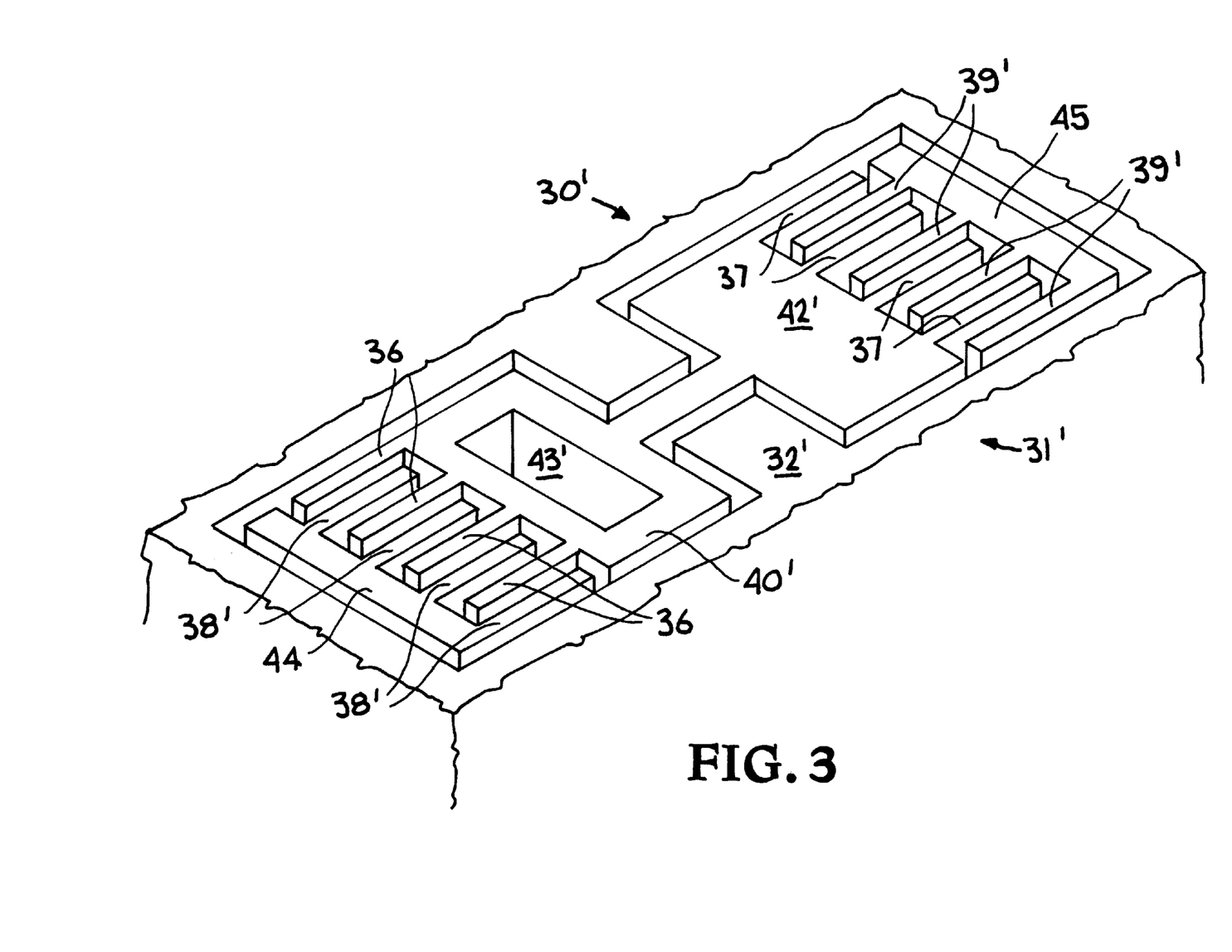
FIG. 3 is a view of the back side of an accelerometer of the invention with interdigitated finger formed by deep etched silicon in a substrate or package.

FIG. 3 is a bottom view of an accelerometer generally similar to the embodiment of FIG. 2, and corresponding components are given corresponding reference numerals. In actual practice the surface of the proof mass 31' and the substrate 32' as shown in FIG. 3 are the upper surfaces of the accelerometer 30'. The spaces between the various components of the proof mass 31' and the silicon substrate or box 32' and between the sets of fingers (electrodes) 36/38 and 37/39 are clearly illustrated, the width of these spaces being determined by the RIE processing. Note that the electrode or finger sets 38 and 39 are connected to common members 44 and 45 which in turn are connected to interface electronics as illustrated in FIG. 4.

Figures 5, 6:
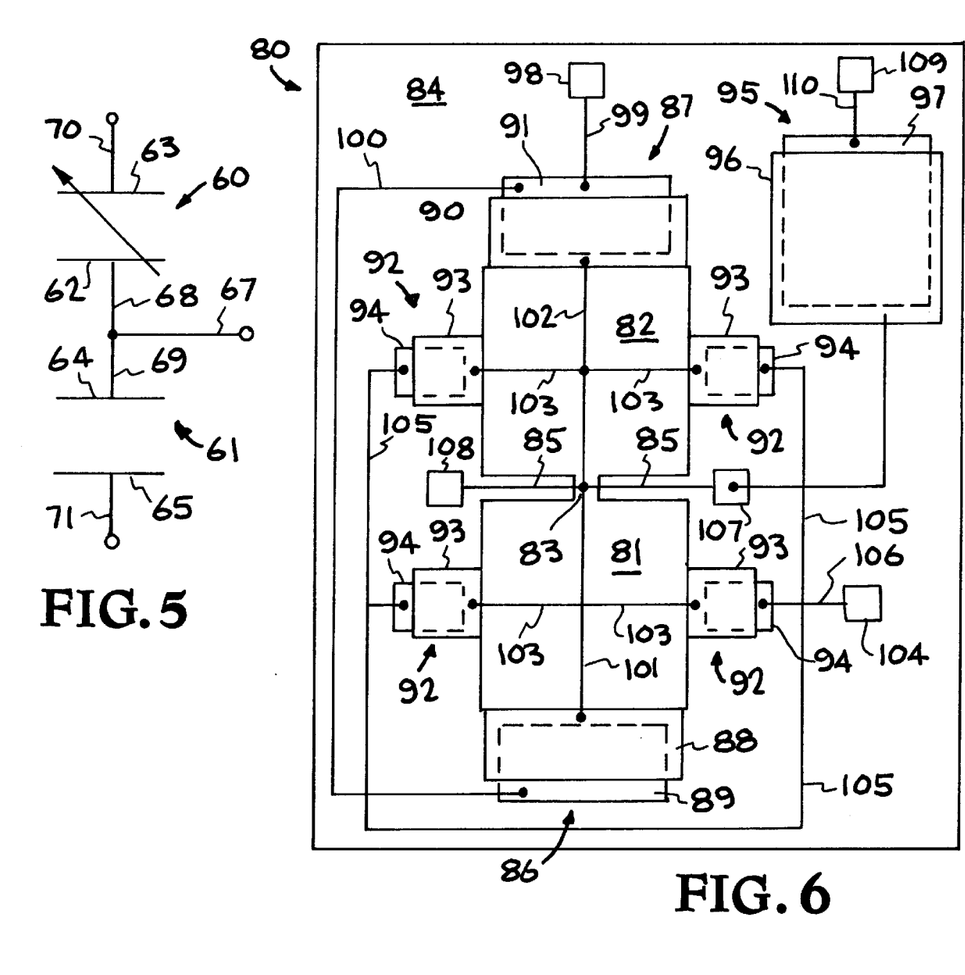
FIG. 5 is an electrical schematic of the capacitors of the accelerometer of either FIGS. 1 or 2 wherein the tethered mass is symmetric allowing for linear deflection of the mass in at least the vertical axis.
FIGS. 6, 7, 8, 9, 10 and 11 illustrate different arrangements of additional capacitive plates in combination with the accelerometer of FIGS. 1 or 2 to provide, for example, feedback control for greater dynamic range of the sensor.

FIGS. 4 and 5 schematically illustrate the capacitor circuitry when the proof mass is of an asymmetric configuration (FIG. 4), as in FIGS. 1–3 wherein each capacitor is variable, or in a symmetric configuration (FIG. 5) where one capacitor is variable and one is a fixed or reference capacity. In FIG. 4, a pair of variable or differential capacitors generally indicated at 50 and 51, includes spaced plates 52–53 and 54–55, with plates 52 and 54 connected to a common power supply via lines 55, 56, and 57, the line 55 may, for example, be the polysilicon tether 13 or 33 of FIGS. 1 and 2. The plates 53 and 55 are connected to interface electrons via leads 58 and 59. Thus as the spacing of the electrodes or plates 14/17 (52–53 of FIG. 4) or plates 15/18 (54–55 of FIG. 4) of the capacitors of FIG. 1 changes the capacitance of capacitor 50 and 51 of FIG. 4 changes as described above, and this change in capacitance is processed by the interface electronics to convert movement (rocking) of the proof mass 11 of FIG. 1 into an electrical signal whereby the degree of motion of the sensor monitors the motion of that ground surface, etc.

FIG. 5 illustrates a symmetric configuration of the proof mass of a sensor such as shown in FIG. 1, wherein the opening 24, for example, has not been formed in the proof mass 11, such that opposite ends of the center tethered proof mass are identical. In such a configuration, as described above, the tether acts as a cantilevered support, allowing a linear deflection (up or down) in the vertical axis, and the two moving capacitors illustrated at 60 in FIG. 5 as a single capacitor, are compared to a reference capacitor 61. As in FIG. 4, the capacitor includes plates 62–63 and 64–65, and are connected via leads 67, 68, and 69 to a pulse generator, and via leads 70 and 71 to interface electronics.

Figure 7:
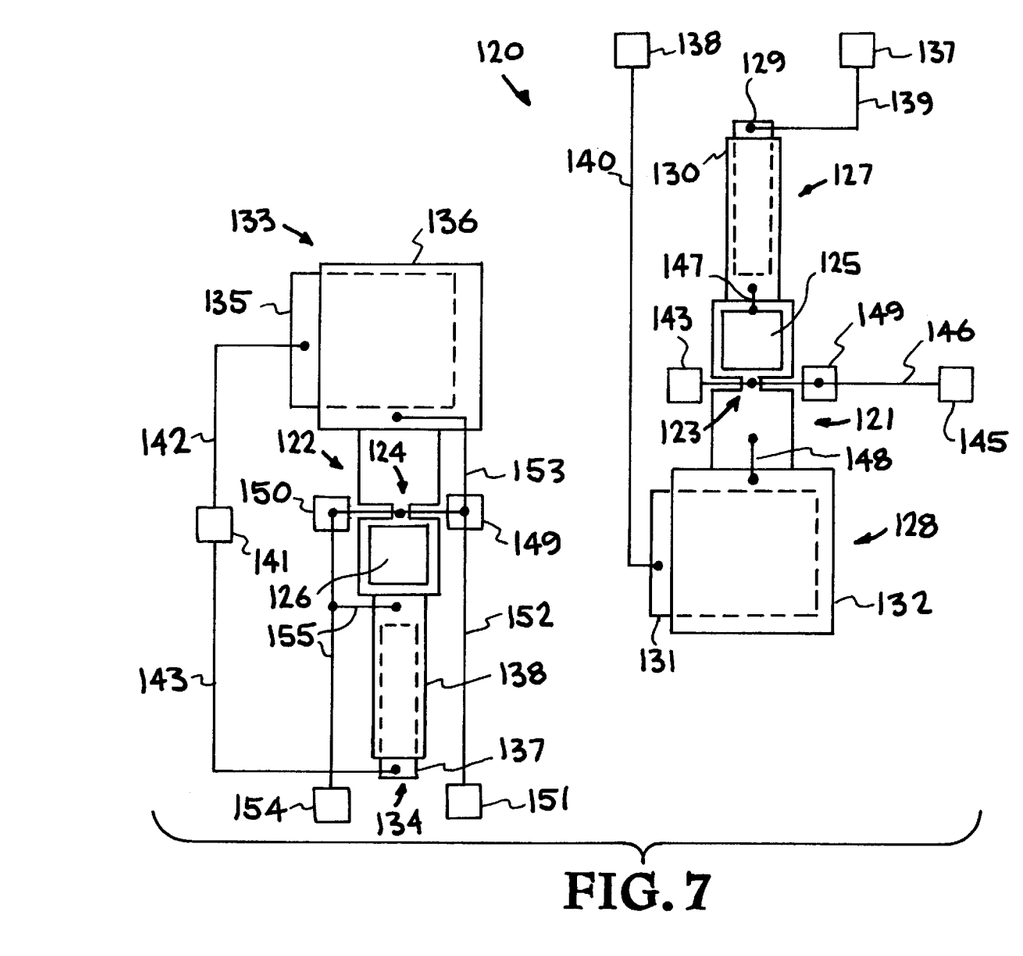
Figure 8:
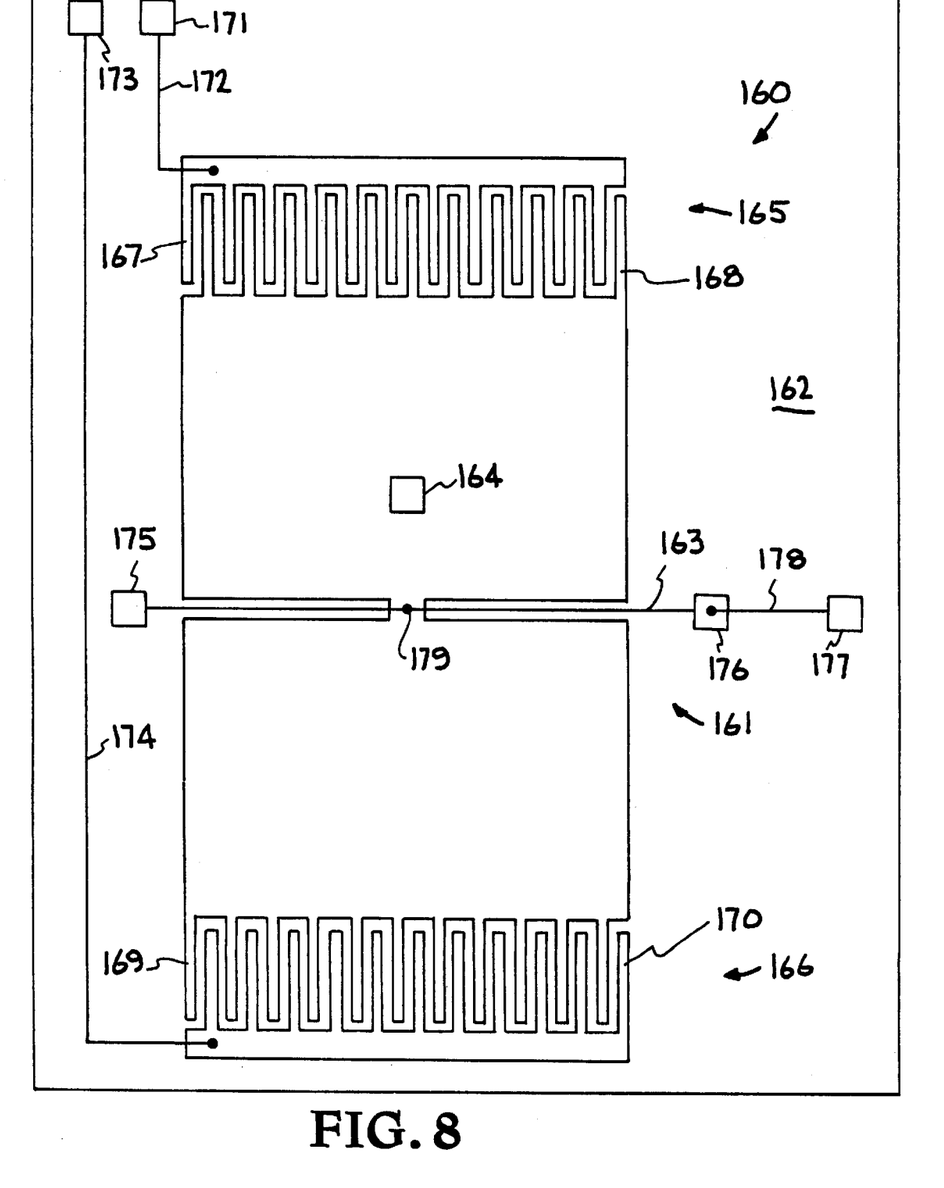

As pointed out above, additional actuating capacitive plates may be used for feedback control of the accelerator, wherein the proof mass is held stationary, and the electrical changes needed to keep the proof mass in a stationary position form the output signal. This gives a greater dynamic range of the sensor, as it is not limited by the maximum deflection of the structure. FIGS. 6–11 illustrate different embodiments for carrying out this feature, with FIGS. 6, 7, and 11 having plate-type capacitors as in FIG. 1, and FIGS. 8, 9, and 10 having interdigitated finger capacitors as in FIGS. 2–3. However, the electrical circuit for each of FIGS. 6 and 9–11 is generally similar to that shown in FIG. 5 which include a variable capacitor and a reference capacitor and the circuit for FIGS. 7 and 8 is similar to FIG. 4.

As shown in FIG. 6, a single sided symmetrical accelerometer sensor with feedback control is illustrated, generally indicated at 80, and includes a central proof mass having end sections 81 and 82 interconnected by central section 83 and is suspended in a substrate 84 by a tether 85, as described above with respect to FIG. 1. Located at the ends of end sections 81 and 82 of the proof mass are a pair of plate type sensor capacitors, generally indicated at 86 and 87 having electrodes 88–89 and 90–91, as in FIG. 1. Four force feedback capacitors generally indicated at 92 of the plate type and each having electrodes 93–94 are located in substrate 84 on opposite sides of end sections 81 and 82 of the proof mass, and a reference capacitor generally indicated at 95 having electrodes 96–97 is located, for example, in the substrate 84. Electrodes 89 and 91 of sensor capacitors 86 and 87 are connected electrically to a contact 98 in substrate 84 by leads 99 and 100, with electrodes 88 and 90 being electrically connected to tether 85 by leads 101 and 102. Electrodes 93 or feedback capacitors 92 are electrically connected to leads 101 and 102 by leads 103, while electrodes 94 of feedback capacitors are electrically connected to a contact 104 in substrate 84 via leads 105 and 106. Tether 85 is electrically connected to contacts 107 and 108 in substrate 84 and to electrodes 88–89 and to electrodes 93, and contact 107 is electrically connected to electrode 96 of reference capacitor 95, with electrode 96 being electrically connected to a contact 109 in substrate 84 by a lead 110. The electrical circuit of FIG. 6 is similar to that of FIG. 5.

FIG. 7 illustrates two double-side asymmetric accelerometers. As generally indicated at 120, this embodiment includes proof masses 121 and 122 of different configurations and located on opposite sides of a substrate, not shown, with each mass mounted in the substrate by tethers 123 and 124 as described above. The proof masses 121 and 122 includes holes 125 and 126 in one end section thereof. Mounted at end of mass 121 are a pair of variable plate-type sensor capacitors 127 and 128 of different size and including electrodes 129–130 and 131–132, respectively. Mounted at each end of mass 122 are a pair of reference capacitors 133 and 134 of different size and including electrodes 135–136 and 137–138. Electrodes 129 and 131 of sensor capacitors 127 and 128 are connected to electric contracts 137 and 138 via leads 139 and 140, with electrodes 135 and 137 of reference capacitors 133 and 134 connected to an electric contact 141 via leads 142 and 143. Tether 123 is connected to contacts 143 and 144 and contact 144 is connected to electrical contact 145 by a lead 146. Electrodes 130 and 132 of sensor capacitors 127 and 128 are connected electrically to mass 121 by leads 147 and 148 and thus connected electrically to tether 123. Tether 124 is connected to contacts 149 and 150 with contact 149 being electrically connected to a contact 151 via lead 152 and to electrode 136 of capacitor 133 via lead 153. Contact 150 is connected electrically to contact 154 via lead 155 and to electrode 138 via lead 155. The electrical circuit of FIG. 7 is generally similar to that of FIG. 4.

FIG. 8 illustrates an embodiment of an accelerometer sensor utilizing interdigitated finger capacitors. The sensor, generally indicated at 160 comprises a proof mass 161 mounted in a substrate 162 via a tether 163, similar to the embodiment of FIGS. 2–3, with mass 161 having an opening or hole 164 therein so as to be asymmetric. A pair of interdigatated finger capacitors generally indicated at 165 and 166 are located at each end of mass 161. Capacitors 165 and 166 include finger electrodes 167–168 and 169–170, respectively. Finger electrodes 167 are connected to an electrical contact 171 via a lead 172, with finger electrodes 169 being connected to an electrical contact 173 via a lead 174. Tether 163 is connected to contacts 175–176, with contact 176 connected electrically with a contact 177 via a lead 178, whereby finger electrodes 168 and 170 are electrically connected via tether 163 to electrical contact 177 via the electrical contact point 179.

Figure 9:
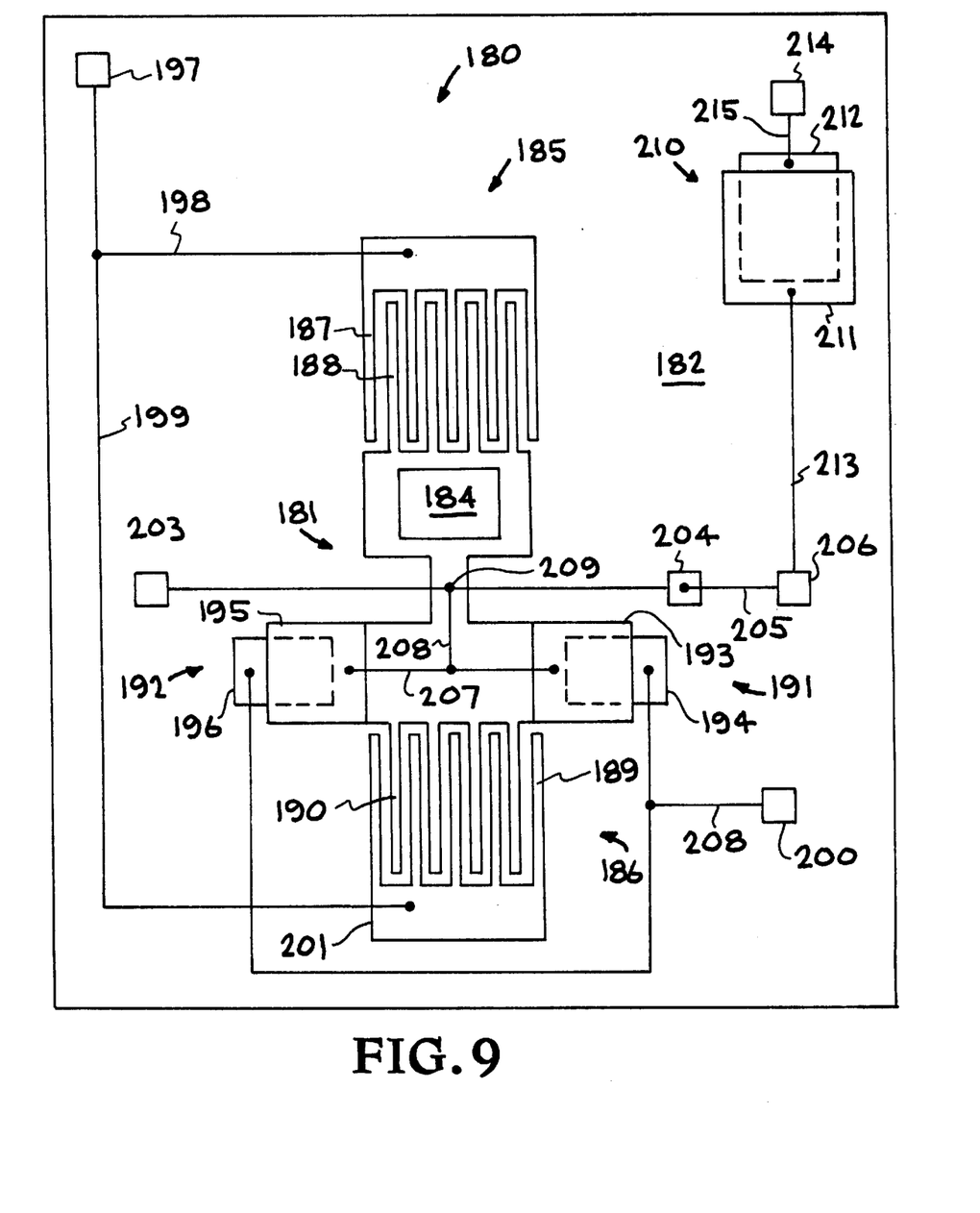

FIG. 9 illustrates another embodiment of an accelerometer sensor utilizing interdigitated finger sensing capacitors, as in FIGS. 2–3, with a feedback control. As shown, FIG. 9 is a single-sided arrangement with force feedback capacitors and a reference capacitor. The electrical circuit of this embodiment is similar to that of FIG. 5. The sensor, generally indicated at 180 includes a proof mass 181 formed in a substrate 182 and retained by a tether 183, with mass 181 having an opening or hole 184 therein. A pair of interdigitated finger sensor capacitors 185 and 186 are located at opposite ends of mass 181 with capacitor 185 having finger electrodes 187 and 188, and capacitor 186 having finger electrodes 189 and 190. A pair of force feedback capacitors 191 and 192 are located on opposite sides of mass 181, with capacitor 191 having electrodes 193–194 and capacitor 192 having electrodes 195–196. Finger electrodes 187 and 189 of sensor capacitors 185 and 186 are connected to an electrical contact 197 via leads 198 and 199. Electrodes 194 and 196 of feedback capacitors 191 and 192 are electrically connected to a contact 200 via leads 201 and 202. Tether 183 is electrically connected to contacts 203 and 204, with contact 204 being connected via a lead 205 to an electrical contact 206. Electrodes 193 and 195 of feedback capacitors 191 and 192 are electrically connected to tether 183 via leads 207 and 208, with electrode fingers 188 and 190 being electrically connected to tether 183 as indicated by contact point 209. A reference capacitor 210 having electrodes 211 and 212 is connected to contact 206 via a lead 213 and to a contact 214 via a lead 215.

Figure 10:
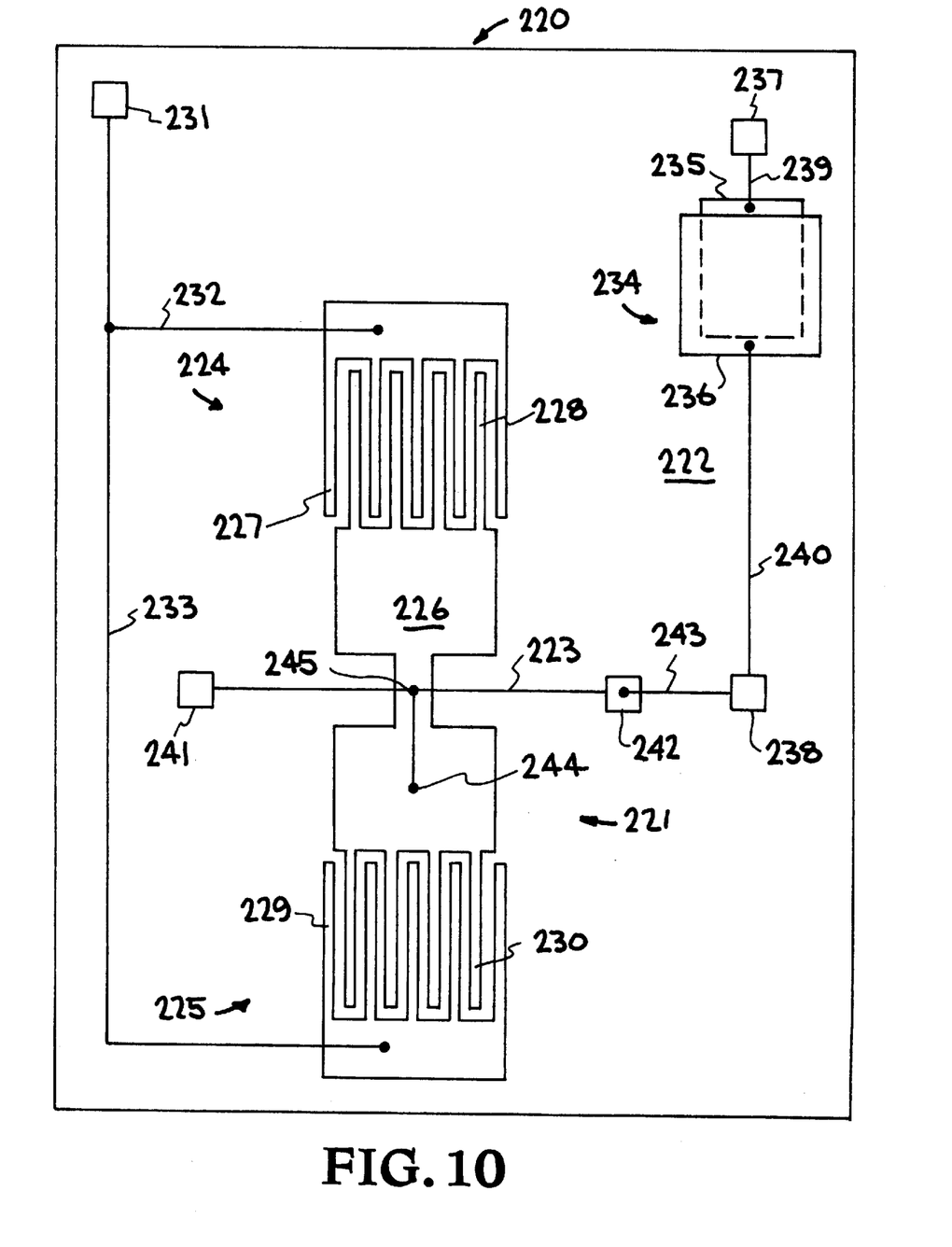

FIG. 10 illustrates another embodiment of an asymmetric single-sided accelerometer utilizing interdigitated finger sensor capacitors. As shown, the sensor generally indicated at 220 includes a proof mass 221 located in a substrate 222 via a tether 223, as in the embodiment of FIGS. 2–3, with interdigitated finger sensor capacitors 224 and 225 located on opposite ends of mass 221. Mass 221 includes an opening 226. Capacitors 224 and 225 include finger electrodes 227–228 and 229–230, respectively, with finger electrodes 227 and 229 being connected to an electrical contact 231 via leads 232 and 233. A reference capacitor 234 having electrodes 235 and 236 is connected to electrical contacts 237 and 238 via leads 239 and 240. Tether 223 is connected to contacts 241 and 242, with contact 242 connected to contact 238 via a lead 243. Tether 223 is also electrically connected to finger electrodes 228 and 230 as indicated by lead 244 and electrical connection point 245. The electrical circuit of FIG. 10 is similar to that of FIG. 5.

Figure 11:
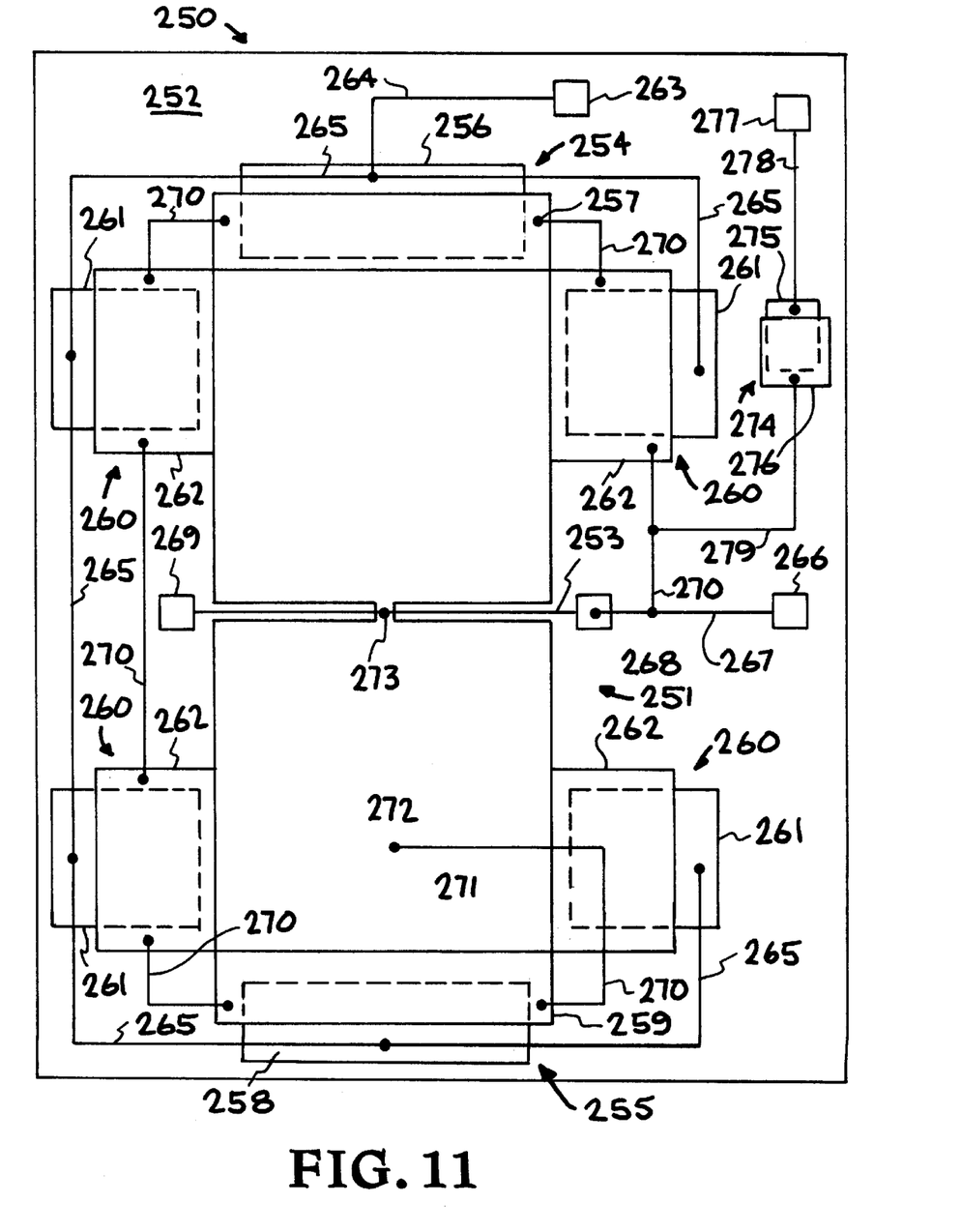

FIG. 11 illustrates a symmetric plate, single-sided accelerator sensor without feedback control. As shown, the sensor generally at 250 includes a symmetric proof mass 251 mounted in a substrate 252 via a tether 253, as in the FIG. 1 embodiment. A pair of plate type sensor capacitors 254 and 255 are located at opposite ends of mass 251, with capacitor 254 having electrodes 256–257 and capacitor 255 having electrodes 258–259. In addition, four (4) plate type sensor capacitors 260 having electrodes 261 and 262 are mounted adjacent mass 251. An electrical contact 263 is connected via leads 264 and 265 to electrodes 256 and 258 of capacitors 254 and 255, and to electrodes 261 of capacitors 260. An electrical contact 266 is connected by lead 267 to contacts 268 and 269 connected to tether 253, and connected by lead 270 to electrodes 262 of capacitors 260 and to electrodes 257 and 259 of capacitors 254 and 255, with the electrode 262 of one of capacitors 260 being connected electrically to mass 251 as indicated by lead 271 and contact point 272 while tether 253 is also electrically connected to mass 253 via contact point 273. A reference capacitor 274 having electrodes 275 and 276 is connected to an electrical contact 277 via a lead 278, and to lead 270 via a lead 279. The electrical circuit is similar to that of FIG. 5.

Alternately, in place of the polysilicon tethers, the Deep RIE process can be used in a combination of front and backside etches to form narrow (2–6 μm), tall (20 μm) tethers out of bulk silicon. These tethers, while allowing for torsional motion, provide for additional stiffness in bending, and help minimize thin-film stress problems. This does require that the tethers are electrically connected to the proof mass.

It has been shown that the present invention provides an accelerometer sensor having low frequency (<500 HZ) and high sensitivity (μG). The accelerometer utilizes a tethered proof mass having capacitors mounted at the ends of the mass, which may be asymmetric or symmetric. Also, additional capacitive plates may be used for feedback control, which gives greater dynamic range and is not limited by the maximum deflection of the sensor.

While particular embodiments, materials, parameters, etc. have been illustrated and/or described to exemplify and teach the principles of the invention, such are not intended to be limiting. Modifications and changes may become apparent to those skilled in the art, and it is intended that the invention be limited only by the scope of the appended claims.

What is claimed is:

1. An accelerometer having high sensitivity at low frequencies, including:

a proof mass having a pair of end sections interconnected by a center section of a smaller-cross section than a cross-section of said pair of end sections, said proof mass being located on a support member having an opening within which said proof mass moves, a tether secured to said center section of proof mass and to said support member for mounting said proof mass in said opening of said support member, each of said end sections of said proof mass being provided with at least one movable capacitor component, said support member being provided with fixed capacitor components cooperating with said movable capacitor components to define at least two capacitors, and means for directing electrical current to said capacitor components, said movable and fixed capacitor components each comprising plurality of cooperating spaced fingers, thereby forming interdigitated finger capacitors.

2. The accelerometer of claim 1, additionally including means for directing electrical current to said tether.

3. The accelerometer of claim 1, wherein one of said pair of end sections of said proof mass has a mass greater than a mass of the other of said pair of end sections.

4. The accelerometer of claim 1, wherein said proof mass is selected from the group consisting of an asymmetric structure and a symmetric structure.

5. The accelerometer of claim 2, wherein said means for directing electrical current includes a plurality of contact pads formed on said support member and electrically connected to one of said fixed capacitor components, and at least one contact pad formed on said support member and electrically connected to said tether.

6. The accelerometer of claim 1, wherein said support member is composed of silicon, wherein said proof member is composed of silicon, wherein said tether is composed polysilicon, and wherein said fixed and movable capacitor components are composed of polysilicon.

7. The accelerometer of claim 6, wherein said silicon proof mass is formed in said silicon support member by a process including deep reactive ion etching, and wherein said polysilicon tether is formed by a process using surface micromachining and silicon conversion techniques.

8. The accelerometer of claim 1, wherein said tether has a thickness of about 2 μm.

9. The accelerometer of claim 1, wherein said proof mass has a mass ranging from about $1.4 \times 10^{-6}$ Kg to about $5 \times 10^{-8}$ Kg.

10. The accelerometer of claim 1, having a resonant frequency in the range of about 16 to 500 Hz.

11. The accelerometer of claim 1, additionally including a feedback control composed of additional capacitor plates.

12. A sensor having a frequency less than 500 Hz and a μG sensitivity, including:

a silicon proof mass located in a silicon support member, and suspended in said support member by a thin polysilicon tether, said silicon proof mass being provided with polysilicon capacitor components at opposite ends, said silicon support member being provided with polysilicon capacitor components located adjacent said opposite ends of said silicon proof mass, and means for supplying electrical current to polysilicon tether and said polysilicon capacitor components, said capacitor components on said silicon proof mass and on said silicon support member being constructed to form interdigitated finger capacitors.

13. The sensor of claim 12, wherein said silicon proof mass is selected from the group consisting of symmetric structures and asymmetric structures.

14. The sensor of claim 12, wherein said silicon proof mass comprises a body having a central section and interconnected end sections, said central section being of a smaller cross section than cross sections of said end sections.

15. The sensor of claim 12, additionally including control feedback means.

* * * * *